United States Patent [19]
Mannion et al.

[11] Patent Number: 5,961,914
[45] Date of Patent: *Oct. 5, 1999

[54] METHOD OF THERMOFORMING POLYOLEFIN RESIN

[75] Inventors: Michael J. Mannion, Spartanburg; Nathan A. Mehl, Moore, both of S.C.

[73] Assignee: Milliken & Company, Spartanburg, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/642,550

[22] Filed: May 3, 1996

Related U.S. Application Data

[63] Continuation of application No. 08/642,550, May 3, 1996.

[51] Int. Cl.$^6$ .................................................. B29C 51/00
[52] U.S. Cl. ........................ 264/544; 264/322; 524/108
[58] Field of Search .................................. 264/544, 291, 264/292, 320, 322; 524/108

[56] References Cited

U.S. PATENT DOCUMENTS

| | | |
|---|---|---|
| 4,016,118 | 4/1977 | Hamada et al. ............... 260/17.4 SG |
| 4,256,687 | 3/1981 | Yazaki et al. ............................ 264/544 |
| 4,519,977 | 5/1985 | Kawaguchi et al. ..................... 264/550 |
| 4,902,553 | 2/1990 | Hwang et al. .......................... 428/156 |
| 4,954,291 | 9/1990 | Kobayashi et al. ................. 252/315.1 |
| 4,977,033 | 12/1990 | Akoa ....................................... 428/516 |
| 5,135,975 | 8/1992 | Rekers .................................... 524/108 |
| 5,149,579 | 9/1992 | Park et al. .............................. 428/213 |
| 5,198,484 | 3/1993 | Mannion ................................ 524/108 |
| 5,209,892 | 5/1993 | Breidt, Jr. et al. ...................... 264/544 |
| 5,216,051 | 6/1993 | Smith et al. ............................ 524/108 |
| 5,338,780 | 8/1994 | Kojima et al. .......................... 524/108 |
| 5,492,741 | 2/1996 | Akoa et al. ............................ 428/35.2 |

FOREIGN PATENT DOCUMENTS

| | | |
|---|---|---|
| 0 178 283 A2 | 10/1985 | European Pat. Off. . |
| 44 20 991 | 12/1995 | Germany . |
| 57-164135 | 10/1982 | Japan . |
| 63-75048 | 4/1988 | Japan . |
| WO 95/25140 | 9/1995 | WIPO .......................... C08K 51/053 |

*Primary Examiner*—Catherine Timm
*Attorney, Agent, or Firm*—Terry T. Moyer; Timothy J. Monahan

[57] ABSTRACT

A process for thermoforming a polyolefin resin sheet is provided having an aromatic aldehyde-polyhydric alcohol condensation product incorporated in the sheet to limit deformation of the sheet during the heating step.

17 Claims, 1 Drawing Sheet

-------- Resin B-1 (4MF polypropylene)
——— Resin B-2 (4MF polypropylene with bis(3,4-dimethylbenzylidene) sorbitol acetal)

METHOD OF THERMOFORMING POLYOLEFIN RESIN

RELATED APPLICATIONS

This application is a continuation of Ser. No. 08/642,550, filed on May 3, 1996.

BACKGROUND OF THE INVENTION

This invention relates to thermoforming polyolefin resin, and in particular to resins which incorporate an aromatic aldehyde-polyhydric alcohol condensation product and an opacifying pigment.

Thermoforming polyolefin resins entails the steps of heating a sheet of the resin until it softens, stretching the softened sheet against a solid form and allowing the sheet to cool. Heating the sheet is typically accomplished by infrared radiant heaters or by forced convection hot air ovens. The sheet is transported through the heating zone while being suspended by pins mounted on bicycle-style chains running along the sides of the sheet. Alternatively, the sheet may be suspended during transport by tenter-style clamps.

Polyolefin resins are semi-crystalline, that is, upon cooling they form amorphous regions and crystalline regions. Because of the low mobility of polymer chains and the high cooling rates that are typically used to process polyolefins, polymer crystals usually form with varying degrees of crystalline perfection. The crystalline regions act like physical cross-links that hold the polymer together. The crystalline cross-links are the reason that most semi-crystalline polymers can be formed elastically at temperatures above the glass transition temperature of the polymer ($T_g$). When semicrystalline polymers are heated above $T_g$, the distribution in crystalline perfection causes the polymer to melt over a range of several degrees. Less perfectly formed crystals have poor thermal stability and are the first to melt. When the first less perfect crystals melt, the physical cross-links begin to break down and the amorphous chains start to relax and flow. At this point the polymer has properties that are ideal for thermoforming; some physical structure exists, but the polymer is easily deformed. At slightly higher temperatures, all of the crystals melt, and the polymer deforms like a viscous liquid.

One of the difficulties encountered in thermoforming resins is maintaining the resin temperature within the narrow processing window, whereby the resin is soft enough to be stretched and shaped, without the loss of the integrity of the sheet. Often under typical processing conditions, the sheet of resin sags or becomes rippled when it is heated. The deformations in the sheet may in turn lead to irregularities in the shaped articles made by the process, such as variations in weight and thickness, anisotropic thermal expansion and shrinkage. The deformation observed in the heated sheet and resulting irregularities may be exacerbated when resins having a relatively high melt flow index are employed. Consequently, resins having a melt flow index of from 1 to 2 are typically used.

The aromatic aldehyde-polyhydric alcohol condensation products employed in the present invention have been incorporated in polyolefin resins as nucleating agents to improve the clarity of the resin. It has been proposed that the condensation products form a network of nucleation sites in the resin upon cooling. Upon crystallization, the resin forms fine spherulites which are smaller than the wavelength of visible light. A description of the nucleating agents may be found in Mannion U.S. Pat. No. 5,310,950, and the references cited therein.

The use of aromatic aldehyde-polyhydric alcohol condensation products as gelling agents for organic solvents is described in Kobayashi et al., U.S. Pat. No. 4,246,000. The condensation products are dissolved in a liquid fuel and castor oil mixture which is used to form a coal-in-oil suspension. The condensation product helps prevent settling of the finely divided coal particles. The aforementioned condensation products have also been employed as gelling agents in cosmetic sticks. For example, Benfatto et al., U.S. Pat. No. 5,376,363 describes a composition containing dibenzylidene sorbitol in an antiperspirant composition. Additionally, the use of dibenzylidene sorbitol to improve the physical property of polyethylene, particularly to increase its tensile strength and raise its melting point, is disclosed in Hamada et al., JP 45-22008 (1970).

A large share of thermoforming is performed with polyolefin resins containing an opacifying amount of pigment. Since the resin is intended to be opaque, there has not been any motivation to incorporate the aromatic aldehyde-polyhydric alcohol condensation products or any other agents which improve resin clarity. Furthermore, the potential benefits for the condensation products with regard to sheet stability during the heating step and facilitation of the use of high melt flow index resins has not been recognized.

SUMMARY OF THE INVENTION

Therefore, the objects of the present invention include: providing a method of thermoforming polyolefin resin with less variation in weight and thickness, less anisotropic expansion and shrinkage and less overall shrinkage; providing a method with a greater range of operating temperatures for the heating step; providing a method in which the sheet of resin is heated while being supported by its side edges; providing a process which has a minimum of sheet deformation or distortion; providing a process which may employ resins having a relatively high melt flow index; and providing a method of thermoforming opacified resins.

Accordingly a method is provided having the steps of incorporating a condensation product of two moles of aromatic aldehyde and one mole of penta-or hexahydric alcohol and an opacifying amount of a pigment into the resin; forming a resin into a sheet; heating the sheet to a temperature above the softening temperature and below the melt temperature of the resin: shaping the softened sheet into an article; and cooling the shaped article.

In an alternative embodiment of the invention a polyolefin resin having a melt flow index of 2.5 to 15, preferably 2.75 to 4.5, and the aforementioned condensation product incorporated therein, is employed in the thermoforming process. The resin may or may not be opaque.

In addition to meeting the above objectives, the present invention has the features and advantages of extending the processing window of the heating step by several degrees centigrade and increasing the elasticity of the resin during the heating step, thereby enhancing the sheet integrity.

DETAILED DESCRIPTION OF THE INVENTION

Figure 1:
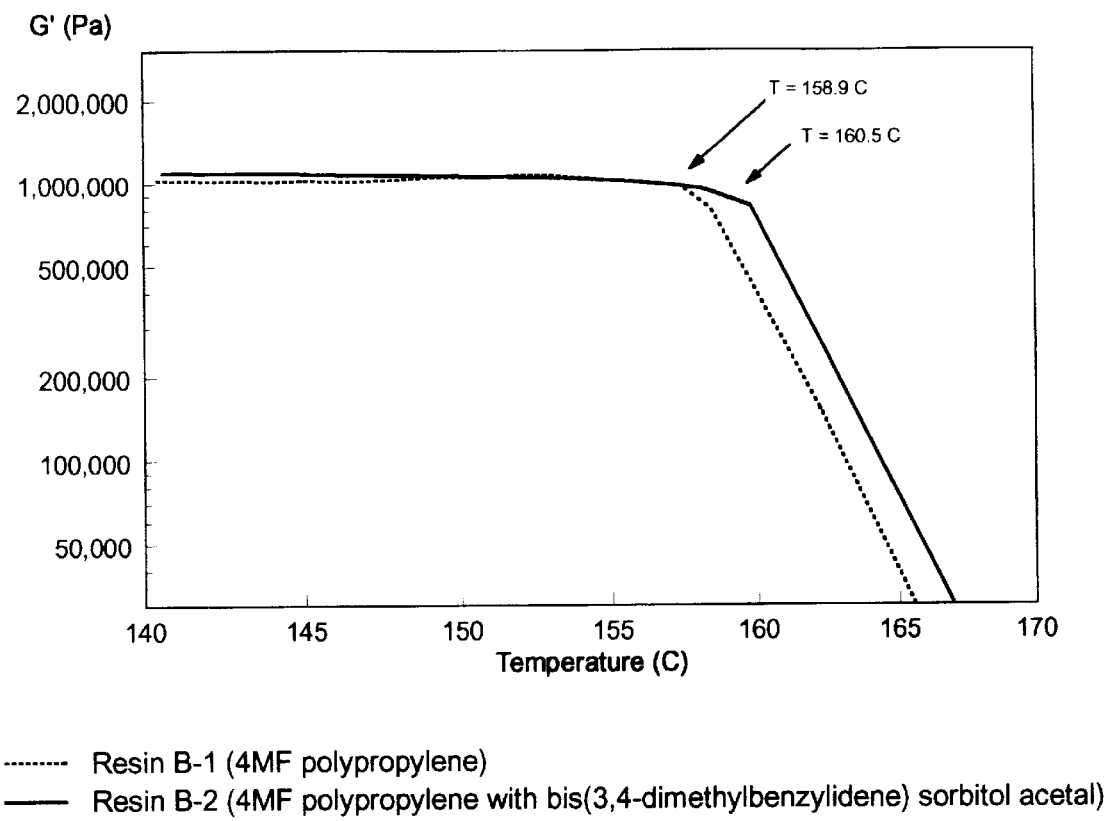
FIG. 1 is a graph of the storage modulus of polypropylene, both with and without bis(3,4-dimethylbenzylidene) sorbitol acetal, over a temperature range of 140 to 170° C.

Without limiting the scope of the invention the preferred embodiments and features are set forth. Unless otherwise indicated, all parts and percentages are by weight and conditions are ambient, i.e. one atmosphere of pressure and 25° C. and the molecular weight is based on mean (number) averages. Unless otherwise specified, aliphatic hydrocarbons are from 1–12 carbons atoms in length, cycloaliphatic hydrocarbons comprise from 3–8 carbon atoms and aromatic compounds are single and fused double-ring unsaturated hydrocarbons.

All of the US patents, and other references cited in the specification are hereby incorporated by reference.

The process of thermoforming polyolefin resin is well known to those skilled in the art and is described in detail in Throne, "Thermoforming" (ISBN 3-446-14699-7) Hanser Publishers, Munich (1987). Briefly the typical thermoforming process steps are clamping, heating, shaping, cooling and trimming. The polyolefin resin is provided in sheets which are generally categorized as "thin-gauge" (sheet thickness less than 0.25 mm) and "thick-gauge" (sheet thickness greater than 0.25 mm). For most applications, the sheet thickness ranges from 0.25 mm to 12 mm, preferably 0.5 mm to 2.5 mm.

The sheet may be heated by infrared radiant heater, forced convection hot air ovens, or a combination of radiant and convection heating. Contact heating, where the sheet is placed against a heated plate, is used in a specialized thermoforming area referred to as trapped sheet forming.

The sheet is heated to a temperature above the softening temperature and below the melt temperature of the resin. The softening temperature is characterized by the onset of melting in the amorphous stage; the melt temperature is characterized by melting of substantially all the crystal regions. The melt temperature may be determined by Differential Scanning Calorimeter (DSC) or by an oven "sag test", by observing when the sheet begins to sag uncontrollably. The precise operating temperatures will depend upon the individual resin used. Polypropylene homopolymer may be heated to a temperature of 141° to 164° C. preferably 153° to 159° C. Polypropylene random copolymer (RCP) 3% ethylene content may be heated to a temperature of 125–150° C., preferably 133–°145° C., but the temperature will vary significantly depending upon the ethylene content.

Once the sheet is heated to the desired temperature it is shaped into an article by molding. The basic mold configuration are the male mold, female mold and matched mold (die forming). The sheet may be pre-stretched prior to molding with air pressure or a mechanical assist known as a plug. The sheet is held in the mold and cooled sufficiently for the resin to maintain its desired shape. The sheet may be trimmed in the mold or in a separate trimming apparatus.

Examples of polyolefin resins which may be used in the thermoforming process of the present invention include polymers and copolymers of aliphatic mono-olefins containing from 2 to 6 carbon atoms, which have an average molecular weight of from about 10,000 to about 2,000,000, preferably from about 30,000 to about 300,000, such as polyethylene, linear low density polyethylene, polypropylene, crystalline ethylene/propylene copolymer (random or block), poly(1-butene) and polymethylpentene. The polyolefins of the present invention may be described as semi-crystalline, basically linear, regular polymers which may be optionally contain side chains, such as are found in conventional low density polyethylene. Preferably the polyolefin resin is polypropylene homopolymer or random copolymer.

The polyolefin resins of the present invention may include aliphatic polyolefins and copolymers made from at least one aliphatic olefin and one or more ethylenically unsaturated comonomers. Generally, the comonomers, if present, will be provided in a minor amount, e.g., about 10% or less or even about 5% or less, based upon the weight of the polyolefin. Such comonomers may serve to improve the mechanical and/or chemical properties of the polymer. Examples include acrylic acid, methacrylic acid, and esters of the same, vinyl acetate, etc.

The present invention can accommodate a wide variety of polyolefin resins. Accordingly, resins having a melt flow index of from 0.6 to 15 (0.6 MF to 15 MF) may be used, preferably from 1.8 MF to 4.5 MF. An advantage of the present invention is that while 1 MF to 2 MF resins are typically employed in thermoforming, now resins having a melt flow index of 2.5 or greater, preferably 2.75 to 4.5 may be employed to take advantage of the desirable performance characteristics of those resins.

A condensation product of two moles of an aromatic aldehyde and one mole of a polyhydric alcohol, preferably a penta- or hexahydric alcohol such as xylitol or sorbitol respectively, is incorporated in the polyolefin resin prior to the resin being formed into a sheet. Examples of suitable aromatic aldehydes includes benzaldehyde and naphthaldehyde, which may be substituted with one or more substituent groups, such as alkyl, halo, alkoxy, poly (oxyatkylene), thioether. Also included are substitutents where the alkyl group forms a carboxylic ring with the aromatic aldehyde.

The condensation products of interest include di-acetals of sorbitol and xylitol having the general formula:

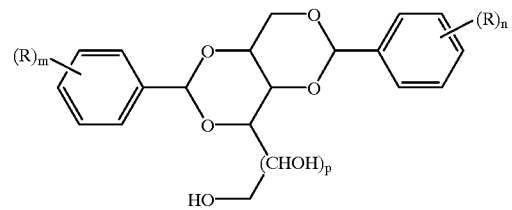

wherein p is 0 or 1, m and n are independently 0–3, R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 6 membered alkyl group forming a carbocyclic ring with adjacent carbon atoms of the unsaturated parent ring. Of particular interest are compounds where p is 1 and R is selected from $C_{1-3}$ alkyl, chlorine, bromine, thioether and a 4-membered alkyl group forming a carbocyclic ring with adjacent carbon atoms of the unsaturated parent ring. Examples of compounds having utility herein include: dibenzylidene sorbitol, di(p-methylbenzylidene) sorbitol, di(o-methylbenzylidene) sorbitol, di(p-ethylbenzylidene) sorbitol, bis (dimethylbenzylidene) sorbitol, especially bis(2,4-dimethylbenzylidene) sorbitol and bis(3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol and bis (trimethylbenzylidene) sorbitol. Also within the scope of the present invention are compounds made with a mixture of aldehydes, including substituted and unsubstituted benzaldehydes, such as Kobayashi et al., U.S. Pat. No. 4,532,280 and Kobayashi et al., U.S. Pat. No. 4,954,291.

The di-acetals of the present invention may be conveniently prepared by a variety of techniques known in the art. Generally, such procedures employ the reaction of 1 mole of D-sorbitol or D-xylitol with about 2 moles of an aldehyde in the presence of an acid catalyst. The temperature employed in the reaction will vary widely depending on the characteristics, such as melting point, of the aldehyde or aldehydes employed as the starting material in the reaction. Examples of suitable reaction medium are cyclohexane, or a combination of cyclohexane and methanol. Water produced by the condensation reaction is distilled off. Typically the mixture is allowed to react for several hours, after which the reaction is cooled, neutralized, filtered, washed, for example, with water or an alcohol, and then dried. Representative processes for manufacturing the condensation products useful in the present invention are disclosed in Murai et al., U.S. Pat. No. 3,721,682 and New Japan Company., Ltd., EP 0 497 976 Al.

The aromatic aldehyde-polyhydric alcohol condensation product may be conveniently added directly to the polyolefin resin during compounding or provided as a resin concentrate, which is "let down" by blending with resin which does not contain the condensation product, prior to the resin being formed into a sheet. The sheet of polyolefin resin may contain from 250 ppm to 20,000 ppm of the condensation product, preferably from 500 ppm to 4,000 ppm.

In addition to facilitating the use of relatively high melt flow index polyolefin resins, the present invention includes the use of polyolefin resins incorporating an aromatic aldehyde-polyhydric alcohol condensation product and an opacifying amount of a pigment. Suitable pigments are disclosed in Gächter & Muller, "Plastics Additives," Third Edition (ISBN 3-446-15680-1) Hanser Publishers, Munich (1990). The pigments typically have a primary particle size range of from 0.01 to 1 micron. Examples of suitable pigments include titanium dioxide, carbon black, lamp black, calcium carbonate, talc, and organic colored pigments, such as azo, phthalocyanine and anthraquinone pigments.

The pigments are compounded into the resins by techniques well known to those skilled in the art, prior to formation of the polyolefin resin into a sheet. The pigment is provided in sufficient concentration to opacify the resin, which may be characterized as having less than 10 percent light transmittance through a sheet of resin. By way of example, concentrations of from 100 ppm to 40 weight percent, preferably 1,000 ppm to 2 weight percent of the pigment in the resin composition may be employed.

The invention may be further understood by reference to the following examples, but is not intended to be unduly limited thereby.

EXAMPLE 1

The following example demonstrates that incorporation of the aromatic aldehyde-polyhydric alcohol condensation product in the resin increases the temperature range over which the softened resin sheet maintains elasticity during the thermoforming process. It is believed that the loss of elasticity results in wrinkling, puckering, and sagging of the sheet during the heating step, which in turn leads to irregularities and defects in articles shaped from the sheet.

Resins

Resin A-1: polypropylene homopolymer (2MF)

Resin A-2: polypropylene homopolymer (2MF) containing 1,900 ppm of bis (3,4-dimethylbenzylidene) sorbitol acetal.

Resin B-1: polypropylene homopolymer (4MF)

Resin B-2: polypropylene homopolymer (4MF) containing 2,300 ppm of bis (3,4-dimethylbenzylidene) sorbitol acetal.

Resin C-1: polypropylene random copolymer (4MF) 3 percent ethylene content

Resin C-2: polypropylene random copolymer (4MF) 3 percent ethylene content containing 2,300 parts per million of the bis(3,4-dimethylbenzylidene) sorbitol acetal.

Resin D-1: polypropylene random copolymer (12MF) 3 percent ethylene content

Resin D-2: polypropylene random copolymer (12MF) 3 percent ethylene content containing 2,500 parts per million of the bis(3,4-dimethylbenzylidene) sorbitol acetal.

All of the resin tested contained a commercial additive package of an antioxidant, lubricant and acid scavenger.

Method

Viscoelastic measurements were made in oscillation mode using a TA Instruments $CSL^2 500$ Dynamic Mechanical Rheometer equipped with 4 cm diameter parallel plates. Isofrequency measurements were performed at either 0.1 Hz or 0.3 Hz while the sample was heated from 100° C. to 170° C. at either 20° C. or 5° C. per minute. The strain was set to a nominal value of 1%.

The Dynamic Mechanical Rheometer was used to measure the viscoelasticity properties of polypropylene while heating the polymer sample from the solid phase to the liquid phase. Over the course of the investigation, it was determined that the storage modulus, G', is the viscoelastic function that is most closely related to the polymer structure. The storage modulus, a measure of the energy that is stored elastically during the deformation of a viscoelastic material, is analogous to a spring constant. When the semi-crystalline polymer is heated above $T_g$, the storage modulus remains nearly constant until the polymer begins to melt and the elasticity of the resin is substantially lost. During the melting transition, the polymer structure melts away and G' decreases by several orders of magnitude. The temperature at which elasticity is lost is referred to as the "onset" temperature.

The results of the experiment are presented below in Table 1 and in the graph in FIG. 1.

TABLE 1

| Resin | Bis(3,4-dimethylbenzylidene) sorbitol acetal (ppm) | Cooling Rate (° C./min) | G' Onset Temperature (° C.) | Δ Onset (° C.) |
|---|---|---|---|---|
| A-1 | 0 | 5 | 157.9 | — |
| A-2 | 1900 | 5 | 159.6 | 1.7 |
| B-1 | 0 | 5 | 158.9 | — |
| B-2 | 2300 | 5 | 160.5 | 1.6 |
| C-1 | 0 | 2 | 145.1 | — |
| C-2 | 2300 | 2 | 147.2 | 2.1 |
| D-1 | 0 | 2 | 143.4 | — |
| D-2 | 2500 | 2 | 147.6 | 4.2 |

The results demonstrate that the onset temperature, measured as the temperature at which G' begins to deviate significantly from the value of G' in the plateau region, is increased by incorporating the aromatic aldehyde-polyhydric alcohol condensation product in the resin. The increase in temperature ranges from as little as 1.6° C. to as much 4.2° C. It is believed that the condensation products form a network of nanometer-scale high aspect ratio fibers, that adds structure to the partially melted polymer by thickening or gelling the amorphous regions. Because of the added structure in the amorphous regions, loss of elasticity occurs at a much slower rate. Consequently, wrinkling, puckering, and sagging of the sheet are easier to avoid during thermoforming.

EXAMPLE II

The following example confirms the Theological date of Example I, using a Dynamic Mechanical Analyzer (DNA) to measure the strain or expansion of a polyolefin resin versus temperature at very low stress. In addition to testing the resins of Example I, a resin containing an opacifying amount of titanium dioxide was also tested Resin Resin E-1: Polypropylene Homopolymer (1.6MF) containing 10,000 ppm titanium dioxide.

Resin E-2: Polypropylene Homopolymer (1.6 MF) containing 10,000 ppm titanium dioxide and 1,900 ppm bis(3, 4-dimethylbenzylidene) sorbitol acetal.

Method

The force exerted on a polyolefin resin sheet, which is pinned or clamped along its sides, while being heated during the thermoforming process was estimated to be from 0.5 to 2.5 newtons. DMA was used in the creep recovery mode to model the stress seen by the sheet in a thermoforming oven. The specimen sheet was first heated to 80° C. then was clamped in the jaws of the DMA and the instrument was zeroed. The sample was slowly heated under an oscillating force, which ranged from 0.9 to 1 newton until the transition from the elastic to the tensile flow state was observed. The temperature at which the transition occurred was identified as the onset temperature.

The results are shown below in Table 2.

TABLE 2

| Resin | Bis(3,4-dimethylbenzylidene) sorbitol acetal (ppm) | TiO$_2$ (ppm) | Onset Temp. (° C.) | Δ Onset (° C.) |
|---|---|---|---|---|
| A-1 | 0 | — | 148.79 | — |
| A-2 | 1900 | — | 151.95 | 3.18 |
| B-1 | 0 | — | 148.23 | — |
| B2 | 2300 | — | 150.48 | 2.25 |
| C-1 | 0 | — | 133.43 | — |
| C-2 | 2300 | — | 135.5 | 2.07 |
| E-1 | 0 | 10,000 | 148.35 | — |
| E-2 | 1,900 | 10,000 | 151.73 | 3.38 |

The results confirm that incorporation of the aromatic aldehyde-polyhydric alcohol condensation product increases the onset temperature at which the elasticity of the resin is substantially diminished. This increase in the yield onset temperature is very significant because it widens the temperature region where the polypropylene exhibits desirable elastic properties from about 141–148 C. with the homopolymer control to about 141–151 C. with the homopolymer containing the sorbitol acteal. In addition to widening the processing window by about 40%, this innovation enables the processor to form parts at a higher temperature which will allow for the production of parts with less internal stress. The difference in absolute values for the onset temperature, between Example I and Example II, is a function of the nature of the testing apparatus and the geometry of the samples.

EXAMPLE III (COMPARATIVE)

The following example demonstrates application of the sheet stabilizing technology to the thermoforming process to control part to part weight variation. The example also includes a comparative test of a commercial nucleating agent for a polyolefin, which is outside the scope of the present invention.

Resin

In addition to Resins A-1 and A-2 from Example I, a resin was prepared with the recommended loading of a phosphite based commercial nucleating agent available from Asahi Denka Kogyo (Japan), sold under the trade name NA-10.

Resin A-3 polypropylene homopolymer (2MF) containing 900 ppm NA-10.

Method

Each resin formulation was extruded into a sheet and pressure formed into containers having a capacity of 325 cc. The thermoforming equipment allowed eight containers to be molded simultaneously. Next all of the containers from a particular mold were weighed and the standard deviation was calculated. The results are compiled below in Table 3.

TABLE 3

| Resin | Additive | Standard Deviation (g) | wt % |
|---|---|---|---|
| A-1 | — | .134 | 1.92% |
| A-2 | 1900 ppm Bis(3,4-dimethylbenzylidene) sorbitol acetal (ppm) | .036 | 0.52% |
| A-3 | 900 ppm NA-10 | .104 | 1.47% |

The results clearly demonstrate that there is less part to part weight variation when the thermoforming process is performed with a polyolefin resin having an aromatic aldehyde-polyhydric alcohol condensation product incorporated therein. Furthermore, the results are consistent with the observations made during the trial, that is, after the heating step, the sheets without the control sheet and the sheet containing NA-10 had an uneven, rippled appearance, whereas the sheet of the present invention was flat prior to forming.

EXAMPLE IV

The following example demonstrates application of the sheet stabilizing technology to the thermoforming process to produce parts which are less prone to shrinkage when they are "hot-filled."

Resin

Resin F-1: polypropylene homopolymer (4MF)

Resin F-2: polypropylene homopolymer (4MF) containing 1,900 ppm bis(3,4-dimethylbenzylidene) sorbitol acetal Resin G-1: polypropylene random copolymer (4MF) 3 percent ethylene content Resin G-2: polypropylene random copolymer (4MF) 3 percent ethylene containing 1,900 ppm bis(3,4-dimethylbenzylindene) sorbitol acetal Method Each resin formulation was extruded into a sheet and pressure formed into drinking cups with a capacity of 200 cc. Four cups were selected from each resin sample and the outer diameter of the cup was precisely measured at a height of 0.5 inches above the base. Next, the cup was filled with 150 to 160ml of water and heated in the microwave oven until the water boiled for approximately one and a half minutes. The cups were allowed to cool at room temperature for one hour. Finally the outer diameter of each cup was measured at a height of 0.5 inches above the base.

The results are compiled below in Table 4.

TABLE 4

| Resin | Bis(3,4-dimethylbenzylidene) sorbitol acetal (ppm) | Average Shrinkage at 0.5" height (inches) | Average Percent Shrinkage 0.5" height |
|---|---|---|---|
| F-1 | — | 0.028 | 1.5% |
| F-2 | 1900 | 0.020 | 1.1% |
| G-1 | — | 0.060 | 3.2% |
| G-2 | 1900 | 0.047 | 2.5% |

The cups that were thermoformed from resin containing the aromatic aldehyde-polyhydric alcohol condensation product shrank substantially less than the controls. It is believed that incorporation of the condensation products reduces deformation in the sheet prior to the sheet being shaped into an article, which results in less stress in the shaped article and less shrinkage when the article is filled with a hot fluid.

There are, of course, many alternative embodiments and modification of the invention which are intended to be included within the scope of the following claims.

What we claim is:

1. A process for forming a shaped article, comprising thermoforming a polyolefin resin by the steps of:

(a) incorporating into the resin (i) the condensation product of two moles of an aromatic aldehyde and one mole of a penta- or hexahydric alcohol in a concentration of 250 to 20,000 ppm; and (ii) a pigment in an amount sufficient to opacify the resin;

(b) forming the resin into a sheet having a thickness of 0.5 to 2.5 mm;

(c) heating the sheet of resin to a temperature above the softening temperature and below the melt temperature of the resin, whereby the sheet is suspended in a heating zone, while being supported by its side edges;

(d) shaping the softened sheet against a mold to form the shaped article; and (e) cooling the shaped article.

2. The process of claim 1, wherein the condensation product has the formula:

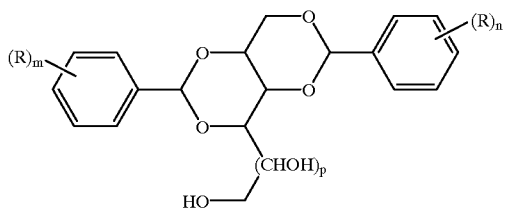

wherein p is 0 or 1, m and n are independently 0–3, R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 6 membered alkyl group forming a carbocyclic ring with adjacent carbon atoms of the unsaturated parent ring.

3. The process of claim 2, wherein the pigment is selected from the group consisting of titanium dioxide, carbon black, calcium carbonate, talc and colored organic pigments, and the pigment is incorporated in the resin in a concentration of from 1,000 to 20,000 ppm.

4. The process of claim 1, wherein the polyolefin resin is selected from the group consisting of polypropylene homopolymer and ethylene/propylene copolymer.

5. The process of claim 1, wherein the resin has a melt flow index of from 2.5 to 15.

6. The process of claim 1, wherein the resin is polypropylene homopolymer and the sheet of resin is heated to a temperature of from 153° to 159° C.

7. The process of claim 1, wherein the resin is ethylene/polypropylene random copolymer and the sheet of resin is heated to a temperature of from 133° to 145° C.

8. The process of claim 1, wherein the condensation product is bis (3,4-dimethylbenzlidene) sorbitol acetal.

9. A process for forming a shaped article, comprising thermoforming a polyolefin resin, wherein the thermoforming includes the steps of:

(a) incorporating into the resin (i) the condensation product of two moles of an aromatic aldehyde and one mole of a penta- or hexahydric alcohol in a concentration of 250 to 20,000 ppm, and (ii) a pigment in an amount sufficient to opacify the resin; wherein the resin has a melt flow index of from 2.5 to 15;

(b) forming the resin into a sheet having a thickness of greater than 0.25 mm;

(c) heating the sheet of resin to a temperature above the softening temperature and below the melt temperature of the resin, whereby the sheet is suspended in a heating zone, while being supported by its side edges;

(d) shaping the softened sheet against a mold to form an article; and (e) cooling the shaped article.

10. The process of claim 9, wherein the condensation product is selected from the group consisting of: dibenzylidene sorbitol, di(p-methylbenzylidene) sorbitol, di(o-methylbenzylidene) sorbitol, di(p-ethylbenzylidene) sorbitol, bis(2,4-dimethylbenyzlidene) sorbitol and bis(3,4-dimethylbenzylidene) sorbitol, bis(3,4-diethylbenzylidene) sorbitol, and bis(5',6',7',8'-tetrahydro-2-naphthylidene) sorbitol and wherein the pigment is selected from the group consisting of titanium dioxide, carbon black, calcium carbonate, talc and colored organic pigments.

11. The process of claim 9, wherein the condensation product is bis(3,4-dimethylbenzylidene) sorbitol acetal.

12. The process of claim 11, wherein the pigment is titanium dioxide and the pigment is incorporated in the resin in a concentration of from 1,000 to 20,000 ppm.

13. A process for forming a shaped article, comprising thermoforming a polyolefin resin selected from the group consisting of propylene homopolymer and ethylene/propylene copolymer, by the steps of:

(a) incorporating into the resin (i) the condensation product of two moles of an aromatic aldehyde and one mole of a penta- or hexahydric alcohol in a concentration of 250 to 20,000 ppm; and (ii) a pigment in an amount sufficient to opacify the resin;

(b) forming the resin into a sheet having a thickness greater than 0.25 mm;

(c) heating the sheet of resin to a temperature above the softening temperature and below the melt temperature of the resin, whereby the sheet is suspended in a heating zone, while being supported by its side edges;

(d) shaping the softened sheet against a mold to form the shaped article;

(e) cooling the shaped article; and (f) filling the article with a fluid.

14. The process of claim 13, wherein the condensation product is selected from the group consisting of: dibenzylidene sorbitol, di(p-methylbenzylidene) sorbitol, di(o-methylbenzylidene) sorbitol, di(p-ethylbenzylidene) sorbitol, bis(2,4-dimethylbenyzlidene) sorbitol and bis(3,4-dimethylbenzylidene) sorbitol, bis(3,4-diethylbenzylidene) sorbitol, and bis(5',6',7',8'-tetrahydro-2-naphthylidene) sorbitol.

15. The process of claim 13, wherein the pigment is selected from the group consisting of titanium dioxide, carbon black, calcium carbonate, talc and colored organic pigments.

16. The process of claim 13, wherein the resin has a melt flow index of from 2.75 to 4.5.

17. The process of claim 13, wherein the condensation product is bis(3,4-dimethylbenzylidene) sorbitol acetal.

* * * * *